United States Patent [19]
Guettes et al.

[11] Patent Number: 5,925,687
[45] Date of Patent: Jul. 20, 1999

[54] PRODUCTION OF FLEXIBLE POLYURETHANE FOAMS

[75] Inventors: Bernd Guettes, Sallgast; Stefan Dinsch, Schipkau; Karl-Heinz Steinchen; Gerd Hoeppner, both of Schwarzheide; Klaus Wagner, Hessheim; Harald Larbig, Ludwigshafen; Heinz-Dieter Lutter, Neckargemünd, all of Germany

[73] Assignee: BASF Aktiengesellschaft, Ludwigshafen, Germany

[21] Appl. No.: 08/897,114

[22] Filed: Jul. 18, 1997

[51] Int. Cl.⁶ .................................................. C08G 18/04
[52] U.S. Cl. ........................ 521/137; 521/170; 521/174; 521/914; 252/182.24; 252/182.27
[58] Field of Search ...................................... 521/170, 174, 521/137, 914; 252/182.24, 182.27

[56] References Cited

U.S. PATENT DOCUMENTS

| | | |
|---|---|---|
| 4,143,072 | 3/1979 | Hetzel et al. |
| 4,316,991 | 2/1982 | Speranza et al. |
| 4,528,112 | 7/1985 | Speranza et al. |
| 5,137,934 | 8/1992 | Williamson et al. |
| 5,238,971 | 8/1993 | Su et al. |

FOREIGN PATENT DOCUMENTS 2144232  of 0000  Canada.

Primary Examiner—John M. Cooney, Jr.
Attorney, Agent, or Firm—Fernando A. Borrego

[57] ABSTRACT

In a process for producing flexible polyurethane foams by reacting a) organic and/or modified organic polyisocyanates with
b) relatively high molecular weight compounds containing at least two reactive hydrogen atoms and
c) if desired, low molecular weight chain extenders and/or cross linkers in the presence of d) blowing agents,
e) catalysts,
f) flame retardants and, if desired
g) further auxiliaries and/or additives, the relatively high molecular weight compounds containing at least two reactive hydrogen atoms (b) comprise at least 10% by weight of polyether polyols which can be prepared by base-catalyzed reaction of lower alkylene oxides with OH-functional initiator substances and are subjected, during or after the molecular addition of alkylene oxide, to a combined thermal/distillative treatment at a water content of at most 0.1% by weight.

The flexible PUR foam produced according to the present invention can be used in the automobile and furniture sectors and for producing flexible foam/textile composites.

12 Claims, No Drawings

PRODUCTION OF FLEXIBLE POLYURETHANE FOAMS

The present invention relates to a process for producing flexible polyurethane (PUR) foams by use of polyether polyols which can be prepared by base-catalyzed reaction of lower alkylene oxides with OH-functional initiator substances and are subjected, during or after the molecular addition of alkylene oxide, to a combined thermal/distillative treatment at a water content of at most 0.1% by weight.

The production of flexible PUR foams by reacting aromatic diisocyanates and/or polyisocyanates with high molecular weight difunctional and/or trifunctional polyether polyols prepared by reacting difunctional and/or trifunctional alkaline initiator substances such as glycols, glycerol and/or trimethylolpropane, (TMP), with lower alkylene oxides in the presence of customary polyurethane catalysts, blowing agents and further additives has been known for a long time. The polyetherol synthesis is carried out by anionic polymerization using base catalysis, in particular using alkali metal and alkaline earth metal hydroxides, at from 80° to 130° C. and elevated pressures. After the synthesis, the mixture is neutralized by means of acid, in particular hydrochloric and/or phosphoric acid, to remove the catalyst, distilled to remove water and other volatile constituents, in particular under reduced pressure and at 80°–130° C., and the salts are subsequently removed. To produce PUR, polyol and isocyanate are reacted directly or by the prepolymer process.

Further details on this subject may be found in the Kunststoffhandbuch, Volume VII, Polyurethane, Carl-Hanser-Verlag, Munich, 1st edition 1966, edited by Dr R. Vieweg and Dr A. Höchtlen, and 2nd edition 1983 and 3rd edition 1993, edited by Dr G. Oertel. Appropriate selection of the formative components and their ratios enables flexible polyurethane foams having very good mechanical properties to be produced.

A problem in certain applications of the flexible PUR foam, particularly in the furniture sector and in textile coating, is the odor of the PUR foams. The causes of odor problems which originate from the PUR catalysts and the PUR auxiliaries and additives are eliminated by changing over to higher-boiling, less volatile substances having low vapor pressures and use of catalysts which can be incorporated into the PUR, eg. of the spacer amine type as described in EP-A-05 39 819. The odor-causing substances originating from the polyols can be removed by extraction with water or glycols using a method similar to the removal of cyclic ethers or unsaturated polyol constituents as described in U.S. Pat. No. 4,251,654 or EP-A-576 132. However, this removes only a very limited number of volatile substances, others are only converted under these conditions into substances having a stronger odor (acetal formation or dissociation). The distillation for water removal carried out in the customary purification operation for catalyst removal additionally eliminates, for example as described in DD-A-216248, volatile constituents. The neutralization and subsequent water removal leads to continual pH changes and thus to many transformations of the odor formers (aldehydes, dioxanes) or, as described and intended in WO-A-9318083, even to shifts in the molecular weight composition.

It is an object of the present invention to develop a process for producing flexible PUR foams by reacting organic diisocyanates and/or polyisocyanates with polyols, in particular polyether polyols, in the presence of blowing agents, catalysts, crosslinkers and further customary auxiliaries and additives using modified, completely or largely odor-free polyether polyols, which leads to completely or largely odor-free PUR materials while avoiding additional chemical and extractive operations as well as transformation reactions and molecular weight shifts.

We have found that this object is achieved by the relatively high molecular weight compounds containing at least two reactive 30 hydrogen atoms which are used for producing the completely or largely odor-free flexible PUR foams comprising at least 10% by weight of polyether polyols which can be prepared by base-catalyzed reaction of lower alkylene oxides with OH-functional initiator substances and are subjected, during or after the molecular addition of alkylene oxide, to a combined thermal/distillative treatment at a water content of at most 0.1% by weight.

The present invention accordingly provides a process for producing flexible PUR foams by reacting a) organic and/or modified organic polyisocyanates with b) relatively high molecular weight compounds containing at least two reactive hydrogen atoms and c) if desired, low molecular weight chain extenders and/or cross linkers in the presence of d) blowing agents, e) catalysts, f) flame retardants and, if desired, g) further auxiliaries and/or additives, wherein the relatively high molecular weight compounds containing at least two reactive hydrogen atoms (b) comprise at least 10% by weight of polyether polyols which can be prepared by base-catalyzed reaction of lower alkylene oxides with OH-functional initiator substances and are subjected, during or after the molecular addition of alkylene oxide, to a combined thermal/distillative treatment at a water content of at most 0.1 % by weight.

The present invention also provides for the use of the flexible PUR foams produced according to the present invention in the automobile and furniture sectors and for producing flexible foam/textile composites.

Suitable OH-functional initiator substances are, in particular, difunctional and/or trifunctional compounds such as glycols, for example ethylene glycol and propylene glycol, glycerol and TMP or aminoalcohols or amines and/or proportions of higher alcohols such as sugar alcohols or saccharides. The use of glycerol and/or TMP individually or in combination with proportions of glycols is particularly advantageous.

Lower alkylene oxides used are in particular ethylene oxide (EO), propylene oxide (PO) and/or butylene oxide (BO), preferably EO and 1,2-PO.

The polyether polyols are prepared by base-catalyzed addition of alkylene oxides onto the initiator substances. Catalysts used here are basic compounds, in particular alkali metal or alkaline earth metal hydroxides and/or amines. The alkylene oxides are added on individually in blocks and/or as a random mixture.

The reaction is carried out under customary reaction conditions, in particular at from 80° C. to 130° C. and under atmospheric pressure or at a pressure of up to 1.0 MPa.

The combined thermal/distillative treatment of the polyether polyols is carried out at a water content of at most 0.1% by weight, preferably in a water-free state. It is usually carried out at above 49° C., preferably from 80 to 130° C., under atmospheric pressure or under a reduced pressure of from 1 to 20 mbar, preferably from 1 to 10 mbar, and/or with feeding in of inert gases. The inert gas used is particularly preferably nitrogen. The combined thermal/distillative treatment is preferably carried out by means of an apparatus which increases the surface area, if desired in a countercurrent of an inert gas. Industrial embodiments are, for example, packed columns, bubble cap tray columns, thin-film or falling-film evaporators.

The combined thermal/distillative treatment prevents possible aldehyde transformations, acetal, acrolein and dioxane formation and removes by-products formed.

It can be carried out in a wide variety of stages of the process, for example at pH values of greater than 7 during the alkoxylation, particularly on changing the alkylene oxide, and/or at the end of the molecular addition of alkylene oxide or before addition of water. In a preferred embodiment, the thermal/distillative treatment is carried out on changing from a higher to a lower alkylene oxide at a content of free higher alkylene oxide of at most 1% by weight, based on the weight of the reaction mixture.

According to the present invention, it is likewise possible to carry out the combined thermal/distillative treatment after the molecular addition of alkylene oxide and removal of water and after the salt removal, if desired in combination with an over-acidification of the polyether polyol, i.e. at a pH of less than 7. Furthermore, the treatment can also be carried out under the same conditions during or after the prepolymer preparation.

The combined thermal/distillative treatment can also be carried out at the point in time at which the formation rate of high-odor by-products (aldehydes, acetals) increases. The formation rate of the by-products increases with the proportion of free PO and with the reaction temperature and reaches the greatest rate of increase at the end of the molecular addition of PO (of the long PO block). It is possible to determine this point in time by measuring the content of free PO by means of NIR spectroscopy. The treatment should then be carried out preferably at the end of the addition of the large PO block and/or random PO/EO. The thermal/distillative treatment can be supplemented by an extractive or sorptive treatment with solid sorbents or extractants. Sorbents used are in particular aluminosilicates and/or bentonites and/or activated carbon; customary liquid extractants are used for the extraction. The treatment of the polyether polyol with these agents is preferably carried out at from 40 to 140° C.

After the thermal/distillative treatment, the polyether polyols are treated further in a customary manner. The basic catalyst is neutralized by means of acids, the water formed is distilled off and salts are filtered off.

The polyether polyols prepared and treated in this way are, if desired in admixture with further relatively high molecular weight compounds containing at least two reactive hydrogen atoms, as described below, reacted with the other components to give the flexible PUR foams of the present invention.

The process of the present invention has the advantage that the specific treatment interrupts many formation, transformation and dissociation reactions occurring and/or fixes or removes, prior to dissociation, low molecular weight products already formed, viz. aldehydes, dioxanes, acetals and acroleins, and thereby significantly improves the odor of the polyether polyols, the prepolymers and the flexible PUR foams.

The foams have a uniformly high level of mechanical properties such as a high rebound resilience and low compressive sets. Surprisingly, the thermal/distillative treatment makes it possible to suppress the formation of or to remove in a targeted manner only the most odoriferous by-products without shifting the molecular weight distribution and without structural degradation of the polyol molecules.

The following details may be given about the further starting components which can be used in the process of the present invention:

a) The known organic, eg. aliphatic, cycloaliphatic, araliphatic, heterocyclic and preferably aromatic diisocyanates and/or polyisocyanates are suitable for producing the flexible PUR foams.

Specific examples of aromatic polyisocyanates are: mixtures of diphenylmethane 4,4'-and 2,4'-diisocyanates (MDI), mixtures of MDI isomers and polyphenylpolymethylene polyisocyanates, known as raw MDI, advantageously having an MDI isomer content of at least 50% by weight, preferably from 60 to 90% by weight and more, based on the total weight of the mixture, tolylene 2,4-and 2,6-diisocyanate (TDI) and also the corresponding commercial isomer mixtures, mixtures of 2,4-and 2,6-TDI and MDI, preferably 4,4'- and 2,4'-MDI, and/or raw MDI, for example those having an MDI content of from 30 to 90% by weight, preferably from 40 to 80% by weight, based on the total weight of the raw MDIs. Also suitable are modified polyfunctional isocyanates, i.e. products which are obtained by chemical reaction of organic diisocyanates and/or polyisocyanates. Examples which may be mentioned are diisocyanates and/or polyisocyanates containing ester, urea, biuret, allophanate, isocyanurate and preferably carbodiimide, uretonimine and/or urethane groups. Specific examples are: prepolymers containing urethane groups and having an NCO content of from 14 to 2.8% by weight, preferably from 12 to 3.5% by weight, or pseudoprepolymers having an NCO content of from 35 to 14% by weight, preferably from 34 to 22% by weight, where polyisocyanates modified with urethane groups and based on TDI, have, in particular, an NCO content of from 34 to 28% by weight and those based on 4,4'-MDI, 4,4'- and 2,4'-MDI isomer mixtures or raw MDI, have, in particular, an NCO content of from 28 to 14% by weight, particularly preferably from 28 to 22% by weight, based on the total weight, and are prepared by reacting diols, oxalkylene glycols and/or polyoxyalkylene glycols having molecular weights of from 62 to 6000, preferably from 134 to 4200, with TDI, 4,4'-MDI, MDI isomer mixtures and/or raw MDI, for example at from 20 to 110° C., preferably from 50 to 90° C., with examples of oxyalkylene and polyoxyalkylene glycols, which can be used individually or as mixtures, being: diethylene, dipropylene, polyoxyethylene, polyoxypropylene and polyoxypropylene-polyoxyethylene glycols, polyisocyanates containing carbodiimide groups and/or uretonimine groups, for example those based on MDI isomers and/or TDI.

However, polyfunctional isocyanates which have been found to be particularly useful and are therefore preferably employed are 2,4-TDI, 2,6-TDI, mixtures of 2,4-TDI and 2,6-TDI and in particular mixtures of 4,4'- and 2,4'-MDI, raw MDI having an MDI content of at least 50% by weight, based on the total weight, mixtures of 4,4'- and 2,4'-MDI and 2,6-TDI mixtures, mixtures of raw MDI and 2,4- and 2,6-TDI mixtures and polyisocyanate mixtures containing urethane groups and having an NCO content of from 28 to 14% by weight, based on the total weight, prepared from MDI and/or raw MDI and polyoxypropylene glycols having a molecular weight of from 134 to 4200 or polyoxypropylene-polyoxyethylene polyols having an ethylene oxide content of at most 35% by weight and a molecular weight of from 134 to 4200, preferably from 1800 to 4200.

b) The relatively high molecular weight compounds containing at least two reactive hydrogen atoms (b) which are used are essentially the polyether polyols described above. The polyether polyols thus prepared and treated have mean molecular weights of from 800 to 8000, in particular from 1000 to 7000, and have, depending on the use, primary and/or secondary OH groups at the end and have a negligible proportion of high-odor by-products and other by-products.

The polyether polyols of the present invention can be used alone or in admixture with further relatively high molecular weight compounds containing at least two reactive hydrogen atoms. Suitable compounds for this purpose are the H-functional compounds customary in the production of flexible PUR foams, for example further polyether polyols and polyester polyols, but also polythioether polyols, polyesteramides, hydroxyl-containing polyacetals and hydroxyl-containing aliphatic polycarbonates or mixtures of at least two of the compounds mentioned. Preference is given to additionally using polyether or polyester polyols having mean molecular weights of from 1000 to 8000. The proportion of the polyether polyols used according to the present invention is here at least 10% by weight, preferably from 20 to 100% by weight, based on the component b).

If polyether polyols are used as further relatively high molecular weight compounds containing at least two reactive hydrogen atoms, these are advantageously freed beforehand of high-odor substances by appropriate methods, for example by distillative or extractive treatment.

Further polyether polyols used are advantageously those having a functionality of, on average, from 2.0 to 4.0, preferably from 2.0 to 3.0 and in particular from 2.0 to 2.8, and a molecular weight of, on average, from 2200 to 8000, preferably from 3600 to 6500. Also suitable are mixtures of polyether polyols and polyetherpolyamines having a polyetherpolyamine content of at most 35% by weight, preferably from 0.5 to 12% by weight, based on the total weight. Polyether polyols having molecular weights of below 2200, for example from 250 to 2200, are also suitable but these are advantageously used only in admixture with relatively high molecular weight polyether polyols in such amounts that mixtures having average molecular weights of at least 2200 result.

Suitable polyether polyols can be prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 4, preferably 2 or 3, reactive hydrogen atoms in bonded form, or by cationic polymerization using Lewis acids such as antimony pentachloride, boron fluoride etherate, etc., or bleaching earth as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Examples of suitable initiator molecules are: water, organic dicarboxylic acids such as succinic acid, adipic acid, phthalic acid and terephthalic acid, aliphatic and aromatic, unalkylated, N-monoalkylated, N,N- and N,N'-dialkylated diamines having from 1 to 4 carbon atoms in the alkyl radical, for example unalkylated, monoalkylated and dialkylated ethylenediamine, diethylenetriamine, triethylenetetramine, 1,3-propylenediamine, 1,3- or 1,4-butylenediamine, 1,2- 1,3-, 1,4- 1,5- and 1,6-hexamethylenediamine.

Other suitable initiator molecules are: alkanolamines, dialkanolamines and/or trialkanolamines, for example ethanolamine, diethanolamine, N-methylethanolamine and N-ethylethanolamine, N-methyldiethanolamine and N-ethyldiethanolamine and triethanolamine, and ammonia. Preference is given to using polyhydric, in particular dihydric and/or trihydric alcohols and/or alkylene glycols, for example ethanediol, 1,2-and 1,3-propanediol, diethylene glycol, dipropylene glycol, 1,4-butanediol, 1,6-hexanediol, glycerol and trimethylolpropane, and also pentaerythritol.

The polyether polyols, preferably polyoxypropylene and polyoxypropylene-polyoxyethylene polyols, have, as already indicated, a functionality of from 2 to 4, preferably from 2 to 3.0 and in particular from 2 to 2.8, and molecular weights of from 2200 to 8000, preferably from 3600 to 6500 and in particular from 3900 to 6000, and suitable polyoxytetramethylene glycols have a molecular weight up to about 3500, preferably from 250 to 2200. Particular preference is given to using polyoxypropylene-polyoxyethylene polyols containing more than 50%, preferably more than 70%, of terminal primary hydroxyl groups.

Further suitable polyether polyols are polymer-modified polyether polyols, preferably graft polyether polyols. These can be prepared by in situ polymerization of olefinically unsaturated monomers or mixtures such as styrene, acrylonitrile or preferably styrene/acrylonitrile mixtures in polyether polyols, eg. the above-described polyether polyols, using methods similar to those given in the German Patents 1111394, 1222669 (U.S. Pat. Nos. 3,304,273, 3,383,351, 3,523,093), 1152536 (GB1040452) and 1152537 (GB987618) or by dispersing graft polymers which have been prepared beforehand by free-radical polymerization in solvents in polyether polyols using methods similar to those given in the U.S. Pat. Nos. 3,391,092, 4,014,846, 4,093,573. Polyether polyols suitable for preparing the graft polyether polyols are both the abovementioned saturated polyether polyols which, according to U.S. Reissue Pat. No. 28,715, are essentially free of ethylenically unsaturated units and also olefinically unsaturated polyether polyols as described in the U.S. Pat. No. 3,652,659 and in the U.S. Reissue Pat. No. 29,014. Other suitable polymer-modified polyoxyalkylene polyols are polyurethane-polyether polyol dispersions containing bonded tertiary amino groups as are described, for example, in DE-A-3231497. The polymer-modified polyether polyols, which advantageously comprise from 2 to 35% by weight, preferably from 3 to 25% by weight, based on the total weight, of polymer particles, can like the polyoxyalkylene polyols be used individually or in the form of mixtures.

Polyester polyols used are advantageously those having a functionality of, on average, from 2.0 to 3.5, preferably from 2.0 to 2.8, and a molecular weight of, on average, from 800 to 4000, preferably from 1500 to 2800.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Suitable dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives such as dicarboxylic esters of alcohols having from 1 to 4 carbon atoms or dicarboxylic anydrides. Preference is given to using dicarboxylic acid mixtures of succinic, glutaric and adipic acid in weight ratios of, for example, 20–35:35–50:20–32, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylol propane. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentanediol and 1,6-hexanediol. It is also possible to use polyester polyols derived from lactones, eg. ε-caprolactone, or hydroxycarboxylic acids, eg. ω-hydroxycaproic acid.

The polyester amides which can be used include, for example, the predominantly linear condensates obtained from polybasic, saturated and/or unsaturated carboxylic acids or their anhydrides and polyfunctional saturated and/or unsaturated aminoalcohols or mixtures of polyfunctional alcohols and amino alcohols and/or polyamines.

Suitable hydroxyl-containing polyacetals are, for example, the compounds which can be prepared from glycols such as diethylene glycol, triethylene glycol, 4,4'-dihydroxyethoxydiphenyldimethylmethane, hexanediol and formaldehyde. Suitable polyacetals can also be prepared by polymerization of cyclic acetals.

Suitable hydroxyl-containing polycarbonates are those of the type known per se, which can be prepared, for example, by reacting diols such as 1,3-propanediol, 1,4-butanediol and/or 1,6-hexanediol, diethylene glycol, triethylene glycol or tetraethylene glycol with diaryl carbonates, eg. diphenyl carbonate, or phosgene.

To produce the flexible PUR foams of the present invention, additional use is advantageously made of low molecular weight chain extenders and/or crosslinkers (c). Suitable agents of this type are polyfunctional, in particular difunctional and trifunctional compounds having mean molecular weights of from 18 to about 400, preferably from 62 to about 300. Use is made, for example, of dialkanolamines and/or trialkanolamines such as diethanolamine and triethanolamine, aliphatic diols and/or triols having from 2 to 6 carbon atoms in the alkylene radical, for example ethanediol, 1,4-butanediol, 1,5-pentanediol, 1,6-hexanediol, glycerol and/or trimethylol propane, water and low molecular weight ethoxylation and/or propoxylation products prepared from the abovementioned dialkanolamines, trialkanolamines, diols and/or triols or aliphatic and/or aromatic diamines such as 1,2-ethanediamine, 1,4-butanediamine, 1,6-hexanediamine, 2,4- and/or 2,6-tolylenediamine, 4,4'-diaminodiphenylmethane, 3,3'-dialkyl- and/or 3,3',5,5'-tetraalkyl-substituted 4,4'-diaminodiphenylmethanes, as initiator molecules and alkylene oxide or mixtures.

Preference is given to using dialkanolamines, diols and/or triols and in particular ethanediol, 1,4-butanediol, 1,6-hexanediol, diethanolamine, trimethylolpropane and glycerol or mixtures of at least two of the abovementioned compounds.

The chain extenders and/or crosslinkers are advantageously employed in such amounts that from 0 to 25 parts by weight, preferably from 4 to 10 parts by weight, of the component (c) are present in the reaction mixture per 100 parts by weight of the relatively high molecular weight compounds containing at least two reactive hydrogen atoms (b).

d) Blowing agents which are used for producing the flexible PUR foams of the present invention include preferably water which reacts with isocyanate groups to form carbon dioxide as blowing gas. The amounts of water which are advantageously used are from 0.1 to 8 parts by weight, preferably from 1.0 to 3.5 parts by weight and in particular from 2.0 to 3.0 parts by weight, based on 100 parts by weight of the relatively high molecular weight compounds containing at least two reactive hydrogen atoms (b).

In admixture with water, it is also possible to use physically acting blowing agents, with preference being given to using exclusively physically acting blowing agents for producing the flexible polyurethane foams. Suitable physically acting blowing agents are liquids which are inert toward the organic, modified or unmodified polyisocyanates (a) and have boiling points below 100° C., preferably below 50° C., in particular from –50° C. to 30° C., at atmospheric pressure, so that they vaporize under the action of the exothermic polyaddition reaction. Examples of such liquids which are preferably used are hydrocarbons such as n-pentane, isopentane and cyclopentane, industrial pentane mixtures, n- and iso-butane and propane, ethers such as furan, dimethyl ether and diethyl ether, ketones such as acetone and methyl ethyl ketone, esters such as ethyl acetate and methyl formate, or halogenated hydrocarbons such as methylene chloride, difluoromethane, trichlorofluoromethane, dichlorodifluoromethane, dichloromonofluoromethane, 1,1,1-dichlorofluoroethane, 1,1,1-chlorodifluoroethane, dichlorotetrafluoroethane, tetrafluoroethane, 1,1,2-trichloro-1,2,2-trifluoroethane and heptafluoropropane, and also noble gases such as krypton. Mixtures of these low-boiling liquids with one another or with other substituted or unsubstituted hydrocarbons can also be used.

The required amount of physically acting blowing agents can be determined in a simple manner as a function of the desired foam density and is from 0 to about 30 parts by weight, preferably from 0 to 20 parts by weight, per 100 parts by weight of the relatively high molecular weight compounds (b), with their proportion being reduced proportionately when water is also used.

e) To accelerate the reaction between the relatively high molecular weight compounds containing at least two reactive hydrogen atoms (b), hydroxyl-containing chain extenders or crosslinkers (c) and water as blowing agent (d) and the organic and/or modified organic polyisocyanates (a), customary polyurethane catalysts are incorporated into the reaction mixture. Use is advantageously made of basic polyurethane catalysts, for example tertiary amines such as dimethylbenzylamine, dicyclohexylmethylamine, dimethylcyclohexylamine, bis(N,N,-dimethylaminoethyl) ether, bis(dimethylaminopropyl) urea, N-methylmorpholine or N-ethylmorpholine, dimethylpiperazine, N-dimethylaminoethylpiperidine, 1,2-dimethylimidazole, 1-azabicyclo[2.2.0] octane, dimethylaminoethanol, 2-(N,N-dimethylaminoethoxy) ethanol, N,N',N"-tris(dialkylaminoalkyl)-hexahydrotriazines, eg. N,N',N"-tris (dimethylaminopropyl)-s-hexahydrotriazine, di(4-dimethylaminocyclohexyl)methane and, in particular, triethylenediamine. However, metal salts such as iron (II) chloride, zinc chloride, lead octoate and preferably tin salts such as tin dioctoate, tin di(ethylhexanoate) and dibutyltin dilaurate and also, in particular, mixtures of tertiary amines and organic tin salts are also suitable, A catalyst combination comprising as essential components: triethylenediamine, bis(dimethylaminoethyl) ether, 2-(dimethylaminoethoxy)ethanol, dibutyltin dilaurate, preferably in the following weight ratios: 0.2–1.5:0.1–0.2:0.1–0.25:0.1–0.3:0.05–0.15, has been found to be particularly useful.

Use is advantageously made of from 0.1 to 10% by weight, preferably from 0.3 to 3% by weight, of catalyst based on tertiary amines and/or from 0.01 to 0.5% by weight, preferably from 0.03 to 0.25% by weight, of metal salts or from 0.1 to 5% by weight, preferably from 0.3 to 3.5% by weight, of the abovementioned catalyst combination, based on the weight of the relatively high molecular weight compounds.

f) To increase the flame resistance while simultaneously reducing the smoke density in case of fire, use is made of flame retardants (f), for example melamine or expanded graphite, in effective amounts. The melamine and the expanded graphite can be used in commercial form for this purpose.

Other suitable flame retardants, which can be used in amounts of from 0 to 15 parts by weight, preferably from 0.5 to 8 parts by weight, based on 100 parts by weight of the relatively high molecular weight compounds containing at least two reactive hydrogen atoms (b), are, for example: starch, advantageously selected from the group consisting of maize, rice, potato or wheat starch or mixtures thereof and also unmodified or chemically modified starch derivatives, phosphorus compounds such as tricresyl phosphate, tris(2-chloroethyl) phosphate, tris(2-chloropropyl) phosphate, tris (1,3-dichloropropyl) phosphate, tris(2,3-dibromopropyl) phosphate and tetrakis(2-chloroethyl)ethylene diphosphate and inorganic salts such as antimony trioxide, hydrated aluminum oxide, ammonium sulfate, calcium sulfate, ammonium phosphates and preferably modified or unmodified ammonium polyphosphates.

To simplify handling and for easier processability, dispersions can be prepared from the flame retardants and relatively high molecular weight compounds containing at least two reactive hydrogen atoms. Such melamine/expanded graphite/polyether polyol dispersions which are preferably employed comprise from 5 to 100 parts by weight, preferably from 35 to 80 parts by weight and in particular from 45 to 65 parts by weight, of melamine, from 0.1 to 35 parts by weight, preferably from 1 to 25 parts by weight and in particular from 6 to 18 parts by weight, of expanded graphite and 100 parts by weight of at least one polyether polyol, a polymer-modified polyether polyol or mixtures thereof having a functionality of from 2 to 3 and a molecular weight of from 3600 to 6500. It is advantageous here that the blowing agents (d), catalysts (e) and, if desired, auxiliaries and/or additives (g) can be incorporated without problems into the dispersions or the melamine/expanded graphite/polyether polyol dispersions can be fed separately to the mixing apparatus, preferably the mixing head, and thus metered in simultaneously.

g) If desired, further auxiliaries and/or additives (g) can also be incorporated into the reaction mixture. Examples which may be mentioned are surface-active substances, stabilizers, hydrolysis inhibitors, pore regulators, fungistatic and bacteriostatic substances, dyes, pigments and fillers.

Examples of suitable auxiliaries/additives are surface-active substances which serve to aid the homogenization of the starting materials and may also be suitable for regulating the cell structure of the foams. Examples which may be mentioned are siloxane-oxyalkylene copolymers and other organopolysiloxanes, ethoxylated alkylphenols, ethoxylated fatty alcohols, paraffin oils, castor oil or ricinoleic esters and turkey red oil which are employed in amounts of from 0.05 to 8 parts by weight, preferably from 0.4 to 5 parts by weight, per 100 parts by weight of the relatively high molecular weight compounds (b).

Further details about the abovementioned other customary auxiliaries and additives may be found in the specialist literature, for example the monograph by J. H. Saunders and K. C. Frisch "High Polymers", Volume XVI, Polyurethanes, Parts 1 and 2, Interscience Publishers, 1962 or 1964 or the Kunststoff-Handbuch, Polyurethane, Volume VII, Hanser-Verlag, Munich, Vienna, 1st to 3rd editions, 1966, 1983 and 1993.

To produce the flexible PUR foams of the present invention, the organic, modified or unmodified polyisocyanates (a), the relatively high molecular weight compounds containing at least two reactive hydrogen atoms (b) and, if desired, the chain extenders and/or crosslinkers (c) are reacted in the presence of flame retardants (f), blowing agents (d), catalysts (e) and, if desired, further auxiliaries and/or additives (g) at from 0 to 100° C., preferably from 15 to 80° C., in such ratios that from 0.5 to 2, preferably from 0.8 to 1.3 and in particular about 1, reactive hydrogen atom(s) bonded to the starting components (b) and (c) is/are present per NCO group and, if water is used as blowing agent, the molar ratio of equivalents of water to equivalents of NCO groups is 0.5–5:1, preferably 0.7–0.95:1.

The flexible PUR foams are advantageously produced by the one-shot method by mixing two components A and B, with the starting components (b), (d) to (f) and, if used, (c) and (g) being combined to form the A component and the starting components (a), if desired in admixture with (f), (g) and inert, physically acting blowing agents being used as the B component. Thus, the A and B components only have to be intensively mixed before producing the flexible polyurethane foams. The reaction mixtures can be foamed in open or closed molds and also to give block foam.

The process of the present invention can be used to produce both block and molded flexible foams for all customary applications. In particular, they are employed in the furniture sector for mattresses, couches and seat cushions, in the automobile sector for upholstery in the passenger compartment and in the production of flexible foam/textile composites.

The invention is illustrated by the following examples:

Comparative Example 1

1320 g of glycerol were placed in a 2l autoclave fitted with stirrer, metering-in devices, facilities for heating and cooling and for pressure measurement, 506 g of 45% strength potassium hydroxide solution were added and the mixture was heated to 125° C. while stirring.

The reaction mixture was subsequently distilled at a reduced pressure or about 25 mbar. After about 4 hours, a residual water content of 0.24% by weight was reached.

The vacuum was broken by means of nitrogen and 132 g of monoethylene glycol were added and the mixture was homogenized well.

1790 g of PO were metered into 210 g of this mixture and after a further reaction time of 3 hours at 110° C. a prepolymer having a hydroxyl number of 167 mg KOH/g was obtained.

570 g of this prepolymer were reacted with 1420 g of alkylene oxide, with EO and PO being metered in in parallel in such a way that the proportion of EO was 12% of the total product. Further reaction was carried out for 3 hours at 100° C.

The crude polyetherol was subsequently hydrolyzed with water and neutralized with phosphoric acid. This was followed by a reduced-pressure distillation at 120° C. and a pressure of 20 mbar.

The dried polyetherol was filtered and had the following properties:

| | |
|---|---|
| Hydroxyl number | 48.2 mg KOH/g |
| Viscosity at 25° C. | 545 mPas |
| Water | 0.07% by weight |
| Acid number | 0.03 mg KOH/g |
| Potassium content | 8 ppm |

The polyetherol had a characteristic, unpleasant odor.

Comparative Example 2

The polyol component comprising

| | |
|---|---|
| 100 parts by weight of polyetherol as described in Comparative Example 1 | |
| 3 parts by weight | Water |
| 0.25 part by weight | DABCO Lupragen N201 |
| 0.2 part by weight | Tin(II)octoate |
| 1 part by weight | Stabilizer Tegostab BF 2370 (from Goldschmidt) | was intensively mixed and reacted with
40 parts by weight of TDI 80.

An unpleasant, strongly polluting odor was emitted during processing and from the resulting flexible foam, even after prolonged storage.

The resulting flexible PUR foam had poor physicomechanical properties. The compressive set (22 hours at 70° C.) was 12% (measured in accordance with DIN 53572), the rebound resilience was 48% (measured in accordance with DIN 53573).

EXAMPLE 1

In a 2l autoclave as described in Comparative Example 1, the prepolymer obtained by a method similar to Comparative Example 1 and having a hydroxyl number of 167 mg KOH/g was reacted as described to give the crude polyetherol. The alkaline product was hydrolyzed with water and neutralized with phosphoric acid. Subsequently, a customary reduced-pressure distillation was carried out in the reactor at 115° C. and a pressure of 30 mbar to a water content of 0.1% by weight, followed by a coarse filtration of the salts formed. After reaching the water content, the polyetherol was subjected to a thermal/distillative treatment at 130° C. and a reduced pressure of 18 mbar in a countercurrent of nitrogen in a packed column. The treated polyetherol was filtered and had the following properties:

| | |
|---|---|
| Hydroxyl number | 47.3 mg KOH/g |
| Viscosity at 25° C. | 541 mPas |
| Water | 0.04% by weight |
| Acid number | 0.03 mg KOH/g |
| Potassium content | 4 ppm |

The polyetherol was free of unpleasant odors. No odor pollution occurred during further processing to give flexible PUR foam as described in Example 7. The flexible foam bodies produced likewise had no unpleasant odor.

EXAMPLE 2

In a 2l autoclave as described in Comparative Example 1, the prepolymer obtained by a method similar to Comparative Example 1 and having a hydroxyl number of 167 mg KOH/g was reacted as described to give the crude polyetherol. The alkaline product was distilled in a countercurrent of nitrogen at 130° C. and 20 mbar in a 25 cm packed column, with the product being fed in at the top of the column and the hot nitrogen flowing in the opposite direction over the packing elements. After about 5 hours, the distillation was complete, the crude polyetherol was hydrolyzed with water and neutralized with phosphoric acid. Subsequently, a reduced-pressure distillation was carried out at 120° C. and about 40 mbar. The dried polyetherol was filtered and had the following properties:

| | |
|---|---|
| Hydroxyl number | 47.9 mg KOH/g |
| Viscosity at 25° C. | 557 mPas |
| Water | 0.04% by weight |
| Acid number | 0.03 mg KOH/g |
| Potassium content | 7 ppm |

The polyetherol was free of unpleasant odors. No odor pollution occurred during processing to give flexible PUR foam as described in Example 7. The flexible foam body likewise had no unpleasant odor.

EXAMPLE 3

In a 2l autoclave as described in Comparative Example 1, the prepolymer obtained by a method similar to Comparative Example 1 and having a hydroxyl number of 167 mg KOH/g was reacted as described to give the crude polyetherol. The alkaline product was hydrolyzed with water and neutralized with phosphoric acid. Subsequently, it was distilled to a water content of 0.1% by weight at 115° C. and 40 mbar and filtered. After filtering off the salt, the polyetherol was distilled in a countercurrent of nitrogen at 120° C. and 20 mbar in a 25 cm packed column, with the product being fed in at the top of the column and the hot nitrogen flowing in the opposite direction over the packing elements. After about 5 hours, the distillation was complete. The resulting polyetherol had the following properties:

| | |
|---|---|
| Hydroxyl number | 47.7 mg KOH/g |
| Viscosity at 25° C. | 553 mPas |
| Water | 0.01% by weight |
| Acid number | 0.02 mg KOH/g |
| Potassium content | 8 ppm |

The polyetherol was free of unpleasant odors. No odor pollution occurred during processing to give flexible PUR foam as described in Example 7. The flexible foam body likewise had no unpleasant odor.

EXAMPLE 4

In a 2l autoclave as described in Comparative Example 1, the prepolymer obtained by a method similar to Comparative Example 1 and having a hydroxyl number of 167 mg KOH/g was reacted as described to give the crude polyetherol. The alkaline product was hydrolyzed with water and neutralized with hydrochloric acid. Excess hydrochloric acid was bound by means of PO. The salt-containing product was centrifuged and then filtered. The polyetherol filtrate was, while still hot, introduced via the top into a falling-film evaporator and treated at 130° C. and 25 mbar. After about 3.5 hours, the distillative treatment was complete. The resulting polyetherol had the following properties:

| | |
|---|---|
| Hydroxyl number | 48.0 mg KOH/g |
| Viscosity at 25° C. | 541 mPas |
| Water | 0.02% by weight |
| Acid number | 0.03 mg KOH/g |
| Potassium content | 6 ppm |

The polyetherol was free of unpleasant odors. No odor pollution occurred during processing to give flexible PUR foam as described in Example 7. The flexible foam body likewise had no unpleasant odor.

EXAMPLE 5

1225 g of glycerol were placed in a 2l autoclave as described in Comparative Example 1, 275 g of 45% strength potassium hydroxide solution were added and the mixture was heated while stirring to 130° C. The reaction mixture was subsequently distilled under a reduced pressure of from 40 to 25 mbar. After about 4 hours, a residual water content of 0.04% by weight was reached. The vacuum was broken by means of nitrogen. 170 g of this reaction mixture were reacted at 125° C. and 5 bar with 1630 g of PO to give a prepolymer having a hydroxyl number of 156 mg KOH/g, an after-catalysis was carried out using 54 g of 48% strength potassium hydroxide solution and the product was distilled at a reduced pressure of 25 mbar to a water content of 0.04% by weight. 250 g of this highly catalyzed prepolymer were reacted at 120° C. with 1200 g of PO and the mixture was reacted further for 2 hours at 112° C. The alkaline product was distilled in a countercurrent of nitrogen at 120° C. and 30 mbar in a 25 cm packed column, with the product being fed at the top of the column and the hot nitrogen flowing in the opposite direction over the packing elements. After about 5 hours, the distillation was complete. 1460 g of the distillate were reacted at 112° C. with 330 g of EO, the product was subjected to an after-reaction for half an hour at 110° C., hydrolyzed with water and neutralized with hydrochloric acid. The excess hydrochloric acid was reacted with PO and the chlorohydrins were driven out using nitrogen. The product was subsequently filtered. The resulting polyetherol had the following properties:

| | |
|---|---|
| Hydroxyl number | 34.7 mg KOH/g |
| Viscosity at 25° C. | 834 mPas |
| Acid number | 0.02 mg KOH/g |
| Potassium content | 5 ppm |

The polyetherol was free of unpleasant odors. No odor pollution occurred during processing to give flexible PUR foam as described in Example 7. The flexible foam body likewise had no unpleasant odor.

EXAMPLE 6

In a 2l autoclave as described in Comparative Example 1, the prepolymer obtained by a method similar to Comparative Example 1 and having a hydroxyl number of 167 mg KOH/g was reacted as described to give the crude polyetherol. The alkaline product was hydrolyzed with water and neutralized with phosphoric acid. A reduced-pressure distillation at 130° C. and 40 mbar was subsequently carried out. The dried polyetherol was filtered. The polyetherol thus obtained was passed through a thin-film evaporator with rotating stripper at 120° C. and a reduced pressure of 5 mbar. The resulting polyetherol had the following properties:

| | |
|---|---|
| Hydroxyl number | 47.4 mg KOH/g |
| Viscosity at 25° C. | 546 mPas |
| Water | 0.02% by weight |
| Acid number | 0.03 mg KOH/g |
| Potassium content | 5 ppm |

The polyetherol was free of unpleasant odors. No odor pollution occurred during processing to give flexible PUR foam as described in Example 7. The flexible foam body likewise had no unpleasant odor.

EXAMPLE 7

The polyol component comprising

| | |
|---|---|
| 100 parts by weight of a polyetherol as described in Example 1 or 2 or 3 or 4 or 5 or 6 | |
| 3 parts by weight | Water |
| 0.25 part by weight | DABCO Lupragen N201 |
| 0.2 part by weight | Tin(II) octoate |
| 1 part by weight | Stabilizer Tegostab BF 2370 (from Goldschmidt) | was intensively mixed and reacted with 40 parts by weight of TDI 80.

No unpleasant odor was emitted during processing and from the resulting flexible foam, even after prolonged foam storage.

The flexible PUR foam had very good physicomechanical properties. The measurements of the compressive set (22 hours at 70° C.) and the rebound resilience, measured in accordance with the DIN standards indicated in Comparative Example 2, gave the following values:

| Polyetherol used, as described in Example | Compressive set in % | Rebound resilience in % |
|---|---|---|
| 1 | 7 | 65 |
| 2 | 6 | 75 |
| 3 | 5 | 68 |
| 4 | 4 | 78 |
| 5 | 4 | 73 |
| 6 | 5 | 67 |

We claim:
1. A process for producing flexible polyurethane foams comprising reacting
   a) organic and/or modified organic polyisocyanates with
   b) compounds containing at least two reactive hydrogen atoms and
   c) optionally, chain extenders and/or crosslinkers in the presence of
   d) blowing agents,
   e) catalysts,
   f) flame retardants and, optionally,
   g) further auxiliaries and/or additives,
wherein the compounds containing at least two reactive hydrogen atoms (b) comprise at least 10% by weight of polyether polyols which are prepared by base-catalyzed reaction of lower alkylene oxides selected from the group consisting of ethylene oxide, propylene oxide, butylene oxide and mixtures thereof with OH-functional initiator substances and are subjected, during or after the molecular addition of alkylene oxides, to a combined thermal/distillative treatment at a water content of at most 0.1% by weight and at temperatures of more than 49° C., wherein, if the thermal/distillative treatment is carried out during the molecular addition of alkylene oxides, the thermal/distillative treatment is carried out on changing from a higher molecular weight alkylene oxide to a lower molecular weight alkylene oxide of said alkylene oxides at a content of free higher molecular weight alkylene oxide of at most 1% by weight, based on the weight of the reaction mixture, and, if the thermal/distillative treatment is carried out after the molecular addition of alkylene oxides, the thermal/distillative treatment is carried out at a pH of less than 7.

2. A process as recited in claim 1, wherein the combined thermal/distillative treatment is carried out in a water-free state.

3. A process as recited in claim 1, wherein the combined thermal/distillative treatment is carried out at a temperature of from 80 to 130° C.

4. A process as recited in claim 1, wherein the combined thermal/distillative treatment is carried out in an apparatus providing increased reaction surface area.

5. A flexible polyurethane foam made from odor-free polyether polyols, said foam comprising the reaction product of a) an organic and/or modified organic polyisocyanate with b) a compound containing at least two reactive hydrogen atoms and c) optionally, chain extenders and/or crosslinkers in the presence of d) a blowing agent, e) a catalyst, f) a flame retardant and, optionally, g) auxiliaries and/or additives, wherein the compound containing at least two reactive hydrogen atoms (b) comprises at least 10% by weight of polyether polyols which are prepared via a base-catalyzed reaction of lower alkylene oxides selected from the group consisting of ethylene oxide, propylene oxide, butylene oxide and mixtures thereof with an OH-functional initiator substance and are subjected, during or after molecular addition of alkylene oxides, to a combined thermal/distillative treatment at a water level of at most 0.1% by weight and at a temperature of greater than 49° C., wherein, if the thermal/distillative treatment is carried out during the molecular addition of alkylene oxides, the thermal/distillative treatment is carried out on changing from a higher molecular weight alkylene oxide to a lower molecular weight alkylene oxide of said alkylene oxides at a content of free higher molecular weight alkylene oxide of at most 1% by weight, based on the weight of the reaction mixture, and, if the thermal/distillative treatment is carried out after the molecular addition of alkylene oxides, the thermal/distillative treatment is carried out at a pH of less than 7.

6. A polyurethane foam as recited in claim 5, wherein the combined thermal/distillative treatment is carried out in a water-free state.

7. A polyurethane foam as recited in claim 5, wherein the combined thermal/distillative treatment is carried out at a temperature of from 80 to 130° C.

8. A polyurethane foam as recited in claim 5, wherein the combined thermal/distillative treatment is carried out in an apparatus providing increased reaction surface area.

9. A isocyanate-reactive polyether polyol blend exhibiting substantially odor-free properties, said blend comprising:

an isocyanate-reactive compound containing at least two reactive hydrogen atoms and, optionally, chain extenders and/or crosslinkers a blowing agent, a catalyst, a flame retardant, and auxiliaries and/or additives, wherein the isocyanate-reactive compound comprises at least 10% by weight of polyether polyols which are prepared via a base-catalyzed reaction of lower alkylene oxides selected from the group consisting of ethylene oxide, propylene oxide, butylene oxide and mixtures thereof with an OH-functional initiator substance and are subjected, during or after molecular addition of alkylene oxides, to a combined thermal/distillative treatment at a water level of at most 0.1% by weight and at a temperature of greater than 49° C., wherein, if the thermal/distillative treatment is carried out during the molecular addition of alkylene oxides, the thermal/distillative treatment is carried out on changing from a higher molecular weight alkylene oxide to a lower molecular weight alkylene oxide of said alkylene oxides at a content of free higher molecular weight alkylene oxide of at most 1% by weight, based on the weight of the reaction mixture, and, if the thermal/distillative treatment is carried out after the molecular addition of alkylene oxides, the thermal/distillative treatment is carried out at a pH of less than 7.

10. A polyether polyol blend as recited in claim 9, wherein the combined thermal/distillative treatment is carried out in a water-free state.

11. A polyether polyol blend as recited in claim 9, wherein the combined thermal/distillative treatment is carried out at a temperature of from 80 to 130° C.

12. A polyether polyol blend as recited in claim 9, wherein the combined thermal/distillative treatment is carried out in an apparatus providing increased reaction surface area.

* * * * *